Fig. 1.

INVENTORS.
RICHARD A. SPENCER, JR.
CHARLES B. SMITH
BY
ATTORNEY

Fig. 2.

INVENTORS.
RICHARD A. SPENCER, JR.
CHARLES B. SMITH
BY
ATTORNEY

INVENTORS.
RICHARD A. SPENCER, JR.
CHARLES B. SMITH
BY

ATTORNEY.

INVENTORS.
RICHARD A. SPENCER, JR.
CHARLES B. SMITH
BY

ATTORNEY

Dec. 12, 1961  R. A. SPENCER, JR., ET AL  3,012,337
CARRIER LANDING TRAINER
Filed April 4, 1958  8 Sheets-Sheet 5

INVENTORS.
RICHARD A. SPENCER, JR.
CHARLES B. SMITH
BY

ATTORNEY

Fig. 12.

United States Patent Office 3,012,337
Patented Dec. 12, 1961

3,012,337
CARRIER LANDING TRAINER
Richard A. Spencer, Jr., Chevy Chase, and Charles B. Smith, Silver Spring, Md., assignors to ACF Industries, Incorporated, New York, N.Y., a corporation of New Jersey
Filed Apr. 4, 1958, Ser. No. 726,419
1 Claim. (Cl. 35—12)

This invention relates generally to flight simulators and more particularly to a device for visually training aircraft pilots in making the proper approach maneuvers necessary to execute a safe landing aboard an aircraft carrier.

Briefly, this invention contemplates the provision of a visual indication of an aircraft carrier which is presented to a student pilot during a simulated flight, to provide a realistic environment for practicing landings on a ship at sea. The indication or image must vary in size as the range between the aircraft and carrier changes, must change from a side to a stern view as the bearing changes during the approach and must also change in aspect as the elevation changes. In addition, the direction in which the student must look to see the carrier image, as well as its tilt relative to the cockpit, must vary with the aircraft position and attitude. Furthermore, the simulation of the horizon must properly show the variation or horizon position and tilt as aircraft attitude changes and also the correct angular displacement between the horizon and the carrier image, which displacement is a function of aircraft elevation. All of these visual presentations vary in accordance with an automatic computer output whose inputs are determined by the pilot's operation of control members.

This visual simulation is accomplished by the use of a scale model of an aircraft carrier mounted on a large circular turntable painted to resemble the sea and the carrier wake. A television camera is focused on this carrier model, and the resulting picture is then displayed on a portion of a hemispherical screen surrounding the student pilot, by means of a television projector mounted at the center of the hemisphere, as close as possible to the pilot's head.

The variation in image size with a change in range is obtained by making the distance from camera to model proportional to the output of a range computer which drives a servo-mechanism to which the camera is attached. The change from side to stern view of the carrier, as bearing changes, is accomplished by rotating the turntable with a servo drive actuated by the bearing output of the computer, and the change in aspect as elevation changes is produced by pitching the turntable toward the camera in proportion to the elevation output.

The invention also contemplates the proper presentation of the flag signals given by the Landing Signal Officer, LSO, to the approaching aircraft. These signals must appear to come from the LSO platform located near the stern of the carrier on the port side, and must correspond to the nature of the approach (high, left, right, roger, etc.) and then the concluding signal of cut (to land) or wave off (to make another approach). The method for representing these signals is to place a small projection screen at the LSO position and to project upon this screen, images of the various LSO signals, from slide projectors located beneath the carrier turntable.

An instructor's station, including flight path plotting boards, is provided as a means for monitoring the flight so as to evaluate the performance of the pilot throughout the landing approach.

It is thus seen that the invention provides a device for visually training aircraft pilots by providing the combination of a rotating and tilting carrier model, a closed-circuit television system with a moving camera, a gimbal system for positioning carrier and horizon representations, and a slide projector system for furnishing the proper LSO signals, with all of these units controlled by either the outputs of an automatic computer whose inputs are the pilot's control settings or by predetermined programmed signals representing a perfect approach path.

It is, therefore, the broad object of this invention to provide a device for visually training aircraft pilots in making the proper approach maneuvers necessary to execute a safe landing on a landing surface.

It is a further object of this invention to provide a projection system utilizing a scale model of a landing surface, a hemispherical screen and a closed circuit television system for projecting onto the screen the image apparent to the camera.

It is a further object of this invention to provide an automatic training device for presenting to a pilot the visual sensations which a person would experience when making a landing approach to an aircraft carrier.

Referring now to the drawings, which are hereby made a part of the specification, wherein.

Figure 1:
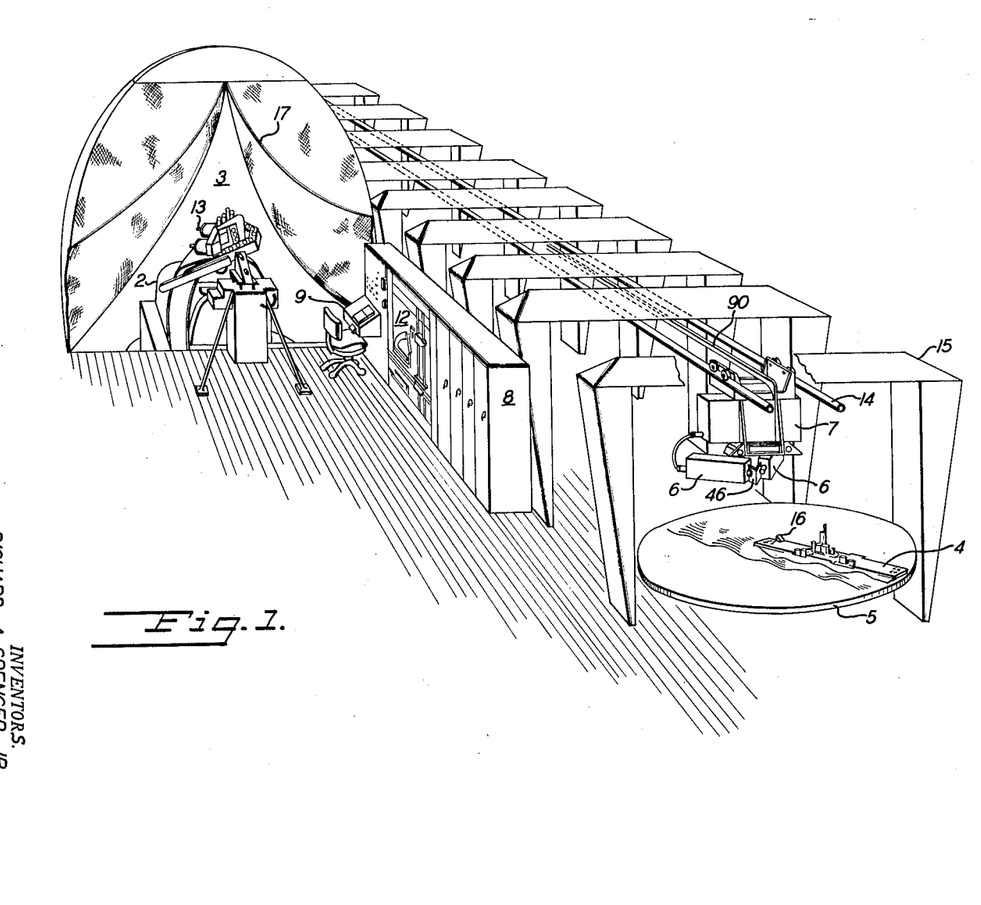
FIG. 1 is a perspective view of the carrier landing trainer.

The carrier landing trainer is shown in perspective in FIG. 1 in which a simulated aircraft cockpit 2, having various flight control members, is provided for the student pilot. In front of the cockpit 2 is a hemispherical screen 3 onto which is projected a television image from projectors 13 mounted behind the cockpit seat. A curtain 17 is provided to prevent extraneous light from reaching the screen 3.

A computer rack 8 houses the automatic computer circuits for handling video information and calculating the various position, velocity and angular position information needed by the trainer. Attached to the computer rack 8 is a plotting board arrangement 12 and an instructor's station 9, to provide means of monitoring the performance of the pilot.

A model of an aircraft carrier 4, having a Landing Signal Officer projection screen 16, is mounted upon a tiltable and rotatable platform or table 5. A framework 15 supports runners 14 upon which the carriage 7 moves relative to the platform 5 in accordance with the operation of computers within the racks 8. Two television cameras 6, having mirror arrangement 46 between them, are attached to the carriage 7 to move therewith. A cam 90 is provided for automatic focusing of the cameras.

Figure 2:
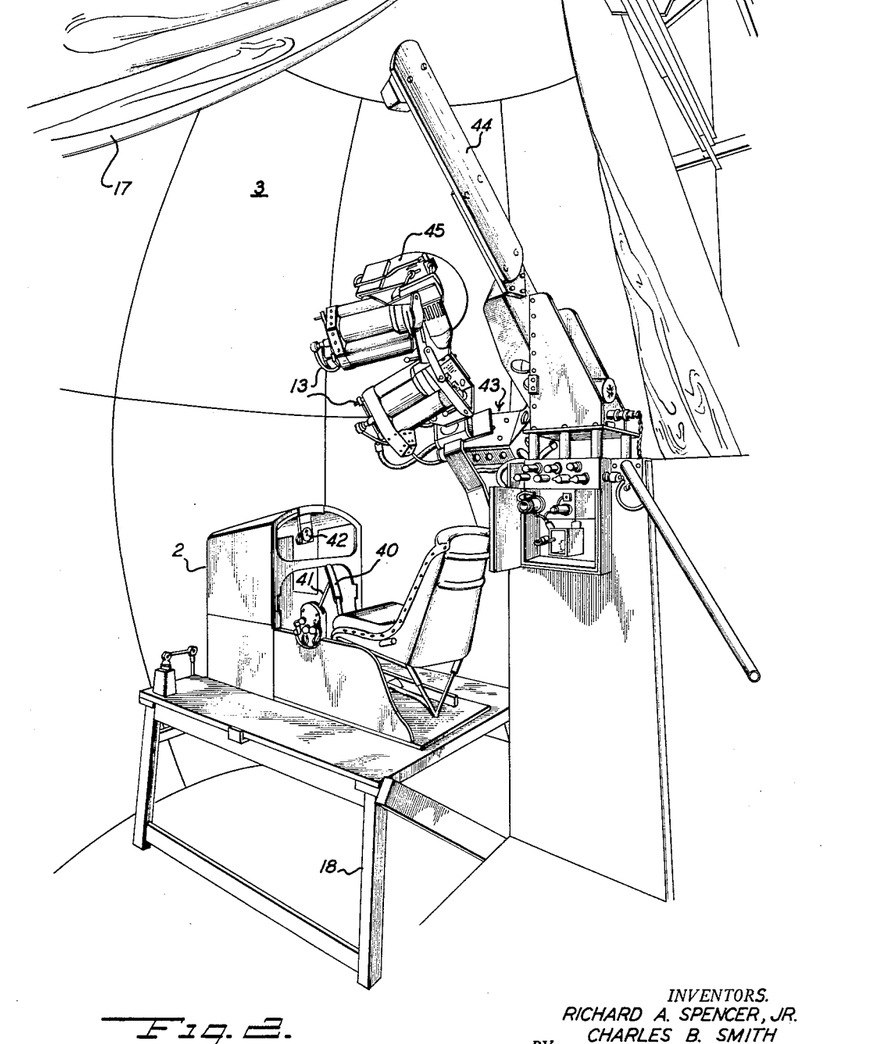
FIG. 2 is a perspective view of the trainer cockpit.

A more detailed view of the cockpit is shown in FIG.

2 in which the cockpit 2 is shown mounted upon platform 18. Accessible to the pilot are a control stick 40, a throttle 41, an air speed indicator 42, and rudder pedals (not shown). The television projectors 13 are mounted within a gimbal arrangement which is counter balanced by the weight 44. The disc 45 moves with the pitch gimbal and is provided to create a shadow representative of the horizon.

Figure 3:
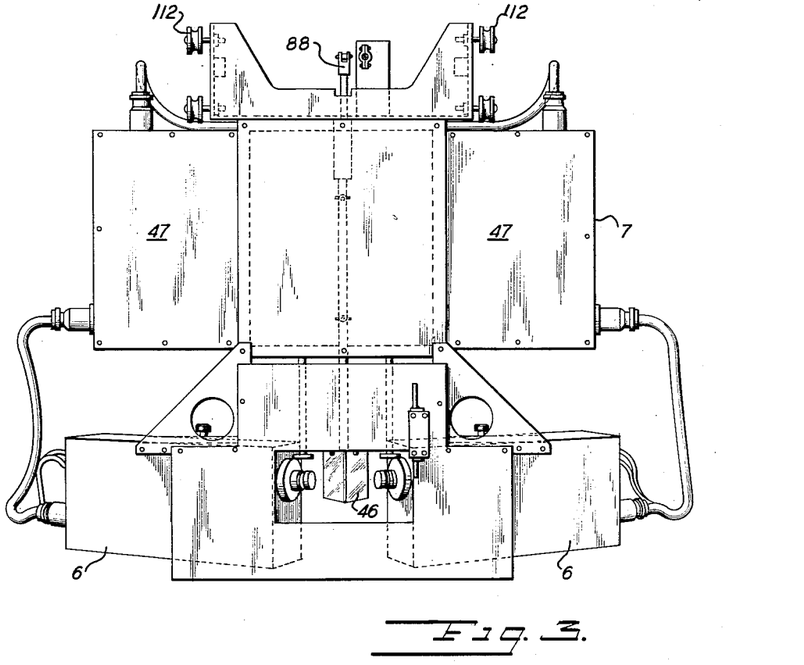
FIG. 3 is a front elevation view of the television camera structure.

The television camera carriage 7 is shown in FIG. 3 in which the two television cameras 6 have a mirror or lens arrangement 46 to divide the image of the scene televised. The rollers 112 support the carriage 7 and provide for easy movement of the carriage along the runners 14 shown in FIG. 1. A rotating drive 88 is mounted centrally on the carriage so as to abut with the cam 90 of FIG. 1 to provide for automatic focusing of the cameras. Within the carriage cabinets 47 are the television circuits for the preamplifier and sweep circuits shown in block diagram form at FIG. 12.

Figure 4:
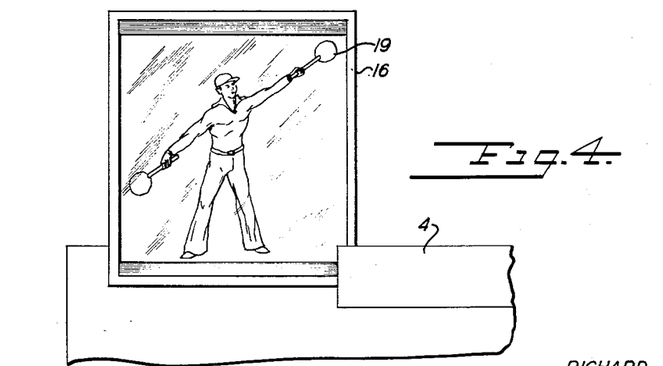
FIG. 4 is an elevation detail of the LSO screen taken on line 4—4 of FIG. 10.

A detail of the carrier model 4 is shown in FIG. 4 wherein an image of a Landing Signal Officer is projected upon the LSO screen 16. Ten separate slide projectors are provided to project any one of ten different images 19 upon the screen in accordance with information derived at the plotting board.

Figure 5:
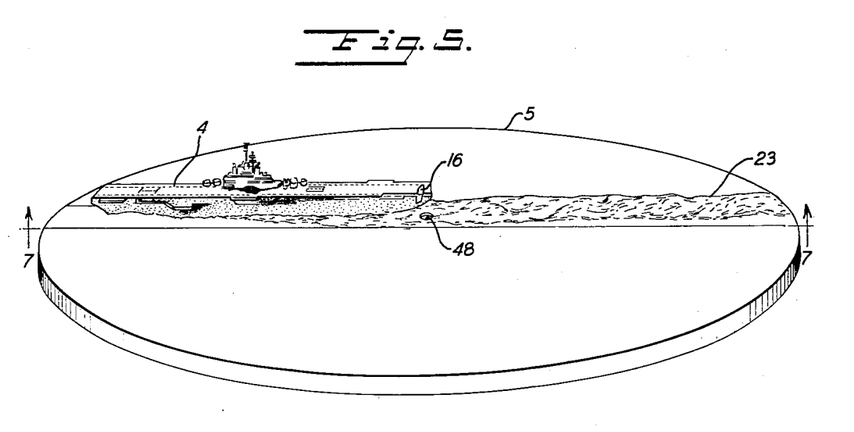
FIG. 5 is a perspective view of the model carrier turntable.

FIG. 5 is a perspective view of the platform or turntable 5 on which an aircraft carrier model 4 and its wake 23 is represented. A map may be used in lieu of the model.

Figure 6:
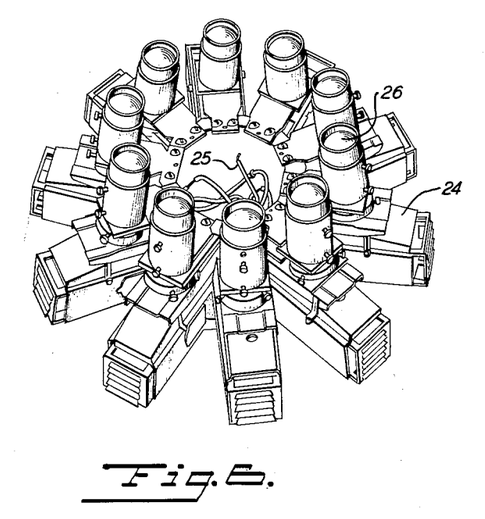
FIG. 6 is a detail perspective of the slide projectors.
Figure 7:
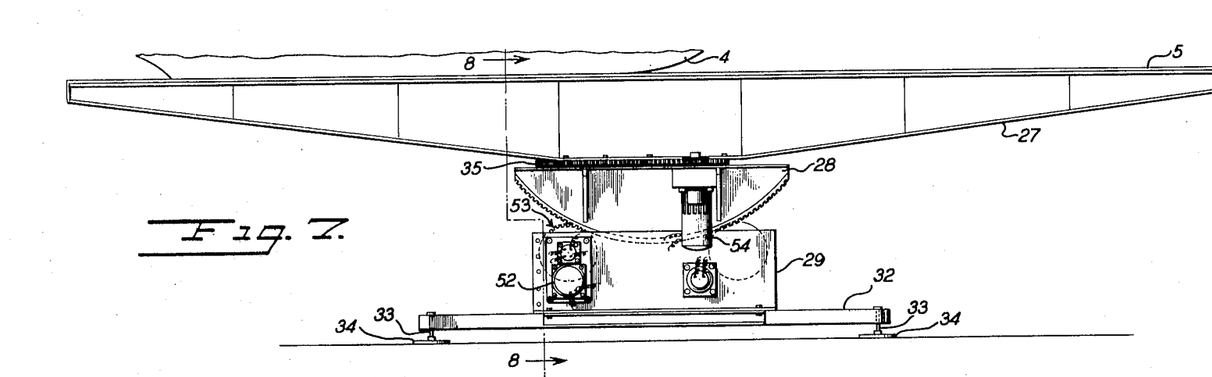
FIG. 7 is a side elevation of the model carrier turntable taken on line 7—7 of FIG. 5.
Figure 8:
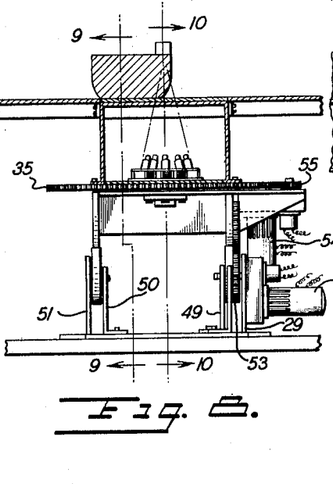
FIG. 8 is a sectional end elevation of the model taken along line 8—8 of FIG. 7.
Figure 9:
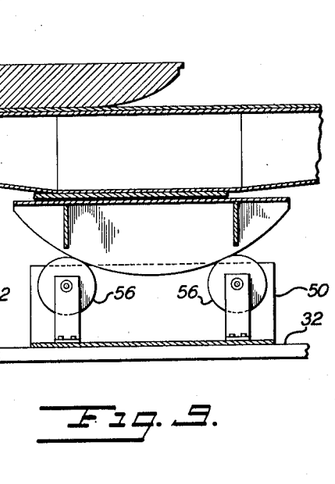
FIG. 9 is a sectional side elevation of the turntable taken on line 9—9 of FIG. 8.
Figure 10:
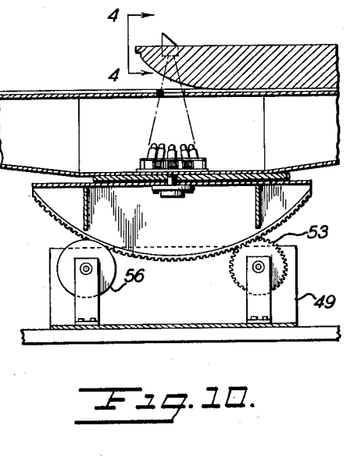
FIG. 10 is a sectional side elevation of the turntable taken on line 10—10 of FIG. 8.

One arrangement for the slide projectors 24 is shown in FIG. 6. The circular type array allows all of the projectors lens 26 to be focused through the turntable aperture 48 onto the LSO screen 16. Control of the slide projectors is accomplished by the electrical conductors 25.

Sectional views of the turntable 5 are shown in FIGS. 7-10 in which a horizontal supporting plate 32 is itself supported by legs 33 and feet 34. Vertical plates 29, 49, 50 and 51 support the wheels 56, gear 53 and motor 52 to motivate the turntable 5 in a tilting mode of operation. The motor 52 is mounted so as to drive gear 53 which meshes with the geared portion of the tiltable platform 28 upon which the horizontal gear 35 is mounted. The motor 54 is mounted so as to activate the gear 55 which in turn drives the main horizontal turning gear 35. The support frame 27 for the platform 5 is mounted so as to turn or rotate in accordance with movement of the horizontal gear 35.

Figure 11:
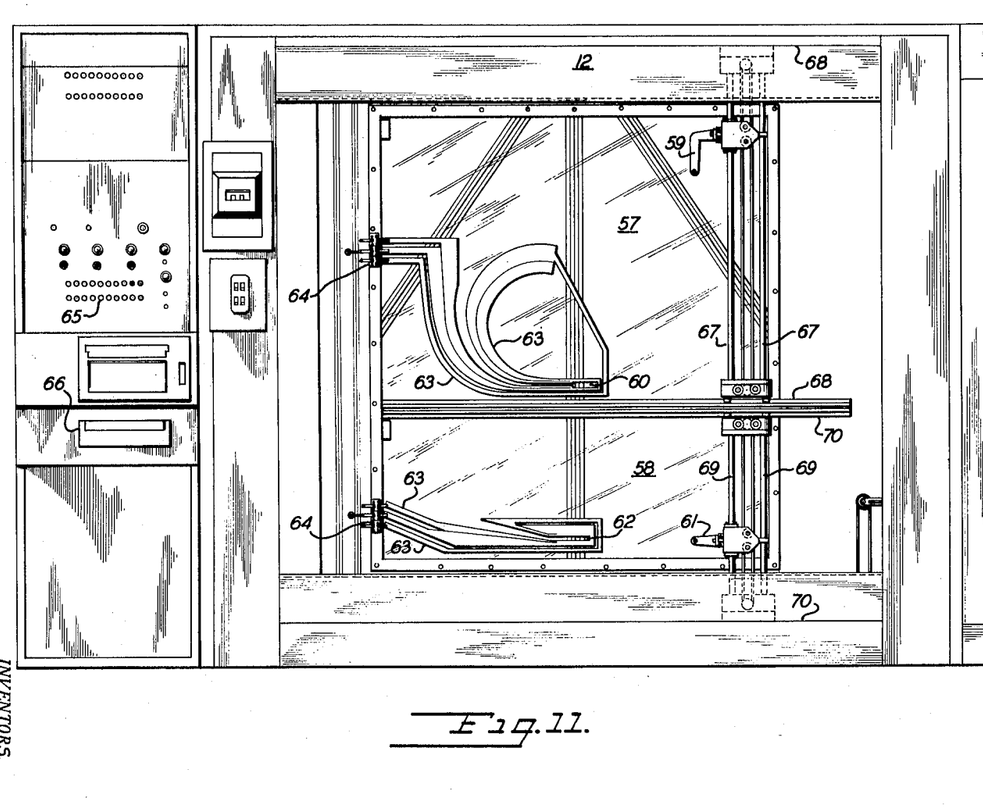
FIG. 11 is an elevation of the instructor's panel and plotting boards.

A view of the instructor's station, including the plotting board 12, is shown in FIG. 11. The board 12 is actually made up of two boards in which the upper board 57 represents a plan view of the approach path to an aircraft carrier landing surface, while the lower board 58 depicts the elevation view of the approach path to a carrier. The plotting board pen 59 moves relative to the area 60 to plot a plan view approach while the pen 61 moves relative to the area 62 to plot elevation approach path. The segments 63 are electrically connected to terminals 64 to transmit the aircraft position as indicated by the pen positions to a priority relay circuit which determines which slides projector should be activated considering the position, altitude and speed of the aircraft. Indicator lights 65 and recorders 66 help the instructor monitor the progress of the flight. The pen 59 moves vertically on runners 67 and horizontally in tracks 68 according to information calculated by the computers of rack 8. The pen 61 moves vertically on runners 69 and horizontally in tracks 70, also in accordance with computer outputs.

Figure 12:
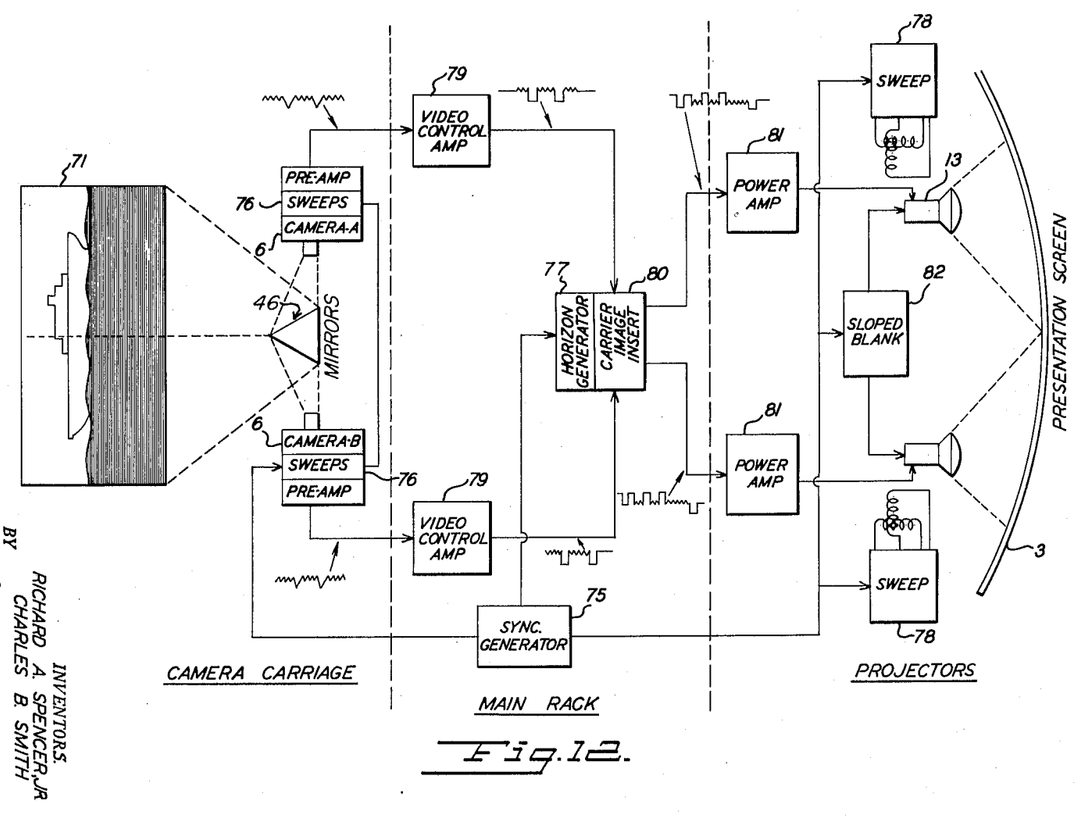
FIG. 12 is a block diagram of the television system used in the carrier landing trainer.
Figure 13:
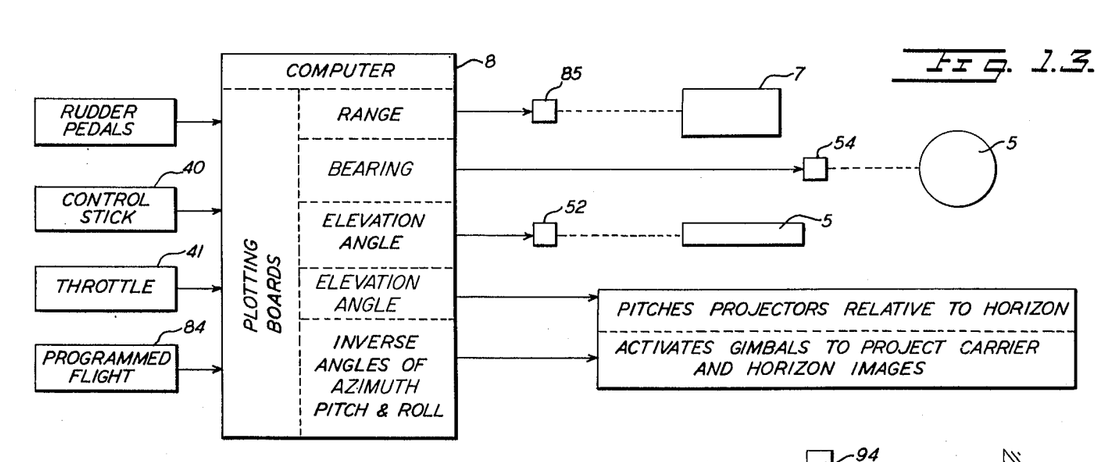
FIG. 13 is a block diagram of the computer system used in the carrier landing trainer.
Figure 14:
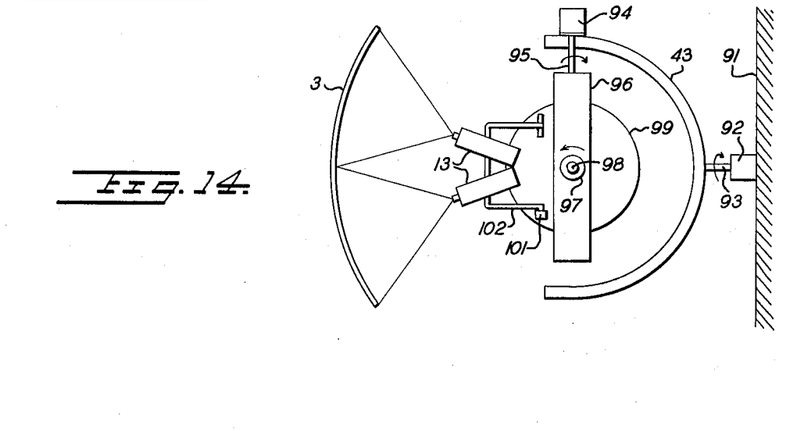
FIG. 14 is a plan outline of the television projector gimbal system.

A schematic block diagram of the closed loop television system is shown in FIG. 12 in which the system is divided as to that apparatus concerned with the camera carriage, the main rack, and the projectors. FIG. 13 shows by block diagram the operation of the computer in controlling various aspects of the visual presentation from information supplied by the control members in the cockpit and the programmed flight circuit, while FIG. 14 shows the gimbal system.

Operation

The overall operation of the carrier landing trainer may best be understood by reference to FIGS. 1 and 2. A scale model of the aircraft carrier 4 is mounted on a large circular turntable 5, which is painted to resemble the sea and the carrier wake. Television cameras 6 are focused on this carrier model, and the resulting picture is then displayed on a portion of a hemispherical screen 3 surrounding the student pilot, by means of the television projectors 13 mounted at the center of hemisphere, as close as possible to the pilot's head. Illumination of the remaining portion of the screen is obtained from a horizon projector, which is essentially an incandescent lamp with a partial shield 45 over it to cast a shadow which simulates the horizon and the darker sea.

Within the cockpit 2 are mounted a flight control stick 40, a throttle 41 and rudder pedals, not shown, which upon activation by the pilot produce voltages in accordance with their respective positions. These voltages are conducted to the computer 8 where they are used to determine the position, direction and velocity of flight relative to the aircraft carrier. The computer 8 automatically computes the distance or range between the aircraft and the carrier during a flight and this range voltage is used to drive a servo-mechanism to which the television camera carriage 7 is attached. The cameras 6 will thus move relative to the model carrier 4 as a function of the computed range between the aircraft and the carrier. Correct focus of the cameras 6 is maintained, as the carriage approaches the turntable, by means of the rotating drive 88 of FIG. 3 moving along the cam 90 of FIG. 1. The scene to be televised is divided into two separate portions by the action of wedge-shaped mirrors 46 which reflects the two resulting images toward the camera 6 lens.

The effect is to have the carrier image presented on the screen 3 to vary in size in accordance with range.

Movement of control stick 40 and the rudder pedals will cause voltages to be sent to the computer 8 which affect the bearing angle between the aircraft position and the center line of the carrier at its stern. This computed bearing angle is used to activate the motor 54 of FIG. 7 and 8 to rotate the turntable 5 so as to present to the pilot an angle of approach to the carrier in accordance with the movements of the control members.

A portion of the computer 8 is dedicated to the calculation of the elevation angle which is measured between a line from the stern of the carrier to the aircraft and a line from the carrier stern to the horizon. This computed value is utilized to operate an elevation angle servo which involves activation of the motor 52 to drive the turntable so as to tilt it from the horizontal. The effect is to alter the view of the carrier in accordance with the elevation angle.

The gimbal arrangement of FIG. 14 is activated by elevation, azimuth, pitch and roll angle information from the computer 8 as shown in FIG. 13. The elevation angle information moves the image of the carrier relative to the horizon so that the amount of carrier superstructure seen above the horizon will vary with the elevation of the aircraft. The azimuth angle from a level aircraft to the carrier, measured relative to the forward direction of the aircraft, is equal to 180° plus bearing minus heading, where the bearing is the angle formed by the intersection of a line drawn from the aircraft to the stern of the carrier and the centerline of the carrier. The heading angle is the heading of the aircraft measured clockwise from a north reference line. Roll, pitch, and azimuth angle position voltages are utilized to position the gimbals to present the roll, pitch and azimuth angle relationship between the cockpit and the carrier image presented on the screen.

It is thus seen that an image of the landing surface, varying in range, direction and elevation characteristics, is presented to the pilot in accordance with the movement of the flight control members.

To have a visual presentation of the actions of a Landing Signal Officer, LSO, a screen 16 is mounted on the carrier model 4. FIG. 4 shows the screen 16 with the image 19 of an LSO projected thereon. Since the image 19 is only one of ten needed to cover all of the signal positions of an LSO, several slide projectors 24 are mounted in a circular configuration as shown in FIG. 6. Each projector has a slide of an LSO in a different signaling position, and only one projector is illuminated at a time. The projector arrangement is mounted below the turntable 5 so as to project the LSO image through aperture 48 in the table onto the screen 16. This is best seen by reference to FIGS. 5, 8 and 10.

The instructor's station for monitoring the flight is shown in FIGS. 1 and 11 in which recording lights 65 and recorders 66 aid in following the progress of the flight and provide a permanent record of each flight. The plotting boards 57 and 58 also provide means for observing the relative position of the aircraft with respect to the landing surface. Board 57 plots a plan view of the approach flight while board 58 plots an altitude view of the approach. The position of pens 59 and 61 represent the position of the aircraft relative to the landing area, represented by 60 and 62. The pens move in accordance with relative position, heading, velocity and altitude of the aircraft with respect to the carrier, as represented by the outputs of the computer 8.

Surrounding the correct approach path on both plotting boards are metallic segments 63 which are insulated from each other and individually connected to separate terminals at the terminal boards 64. These segments control which of the ten LSO projectors is illuminated at a given time. The segments or conductive coatings on the plotting boards close certain electrical circuits to the plotting pens when the aircraft is High or Low, Right or Left, or in the Wave-Off region. A comparison circuit operating from the airspeed output of the computer determines whether or not a speed correction signal is required. The proper priority for the LSO signals is obtained by means of a relay network.

One feature of the carrier landing trainer is that the instructor may institute an automatic approach flight. In such a flight, the pilot's control members are inoperative, the flight information to the movable camera and turntable being previously programmed so as to present to the pilot the visual sensations which would be apparent from the execution of a proper approach flight.

Operation of the closed circuit television system may best be understood by reference to FIG. 12 wherein the image 71 is impressed on the lens of the two cameras 6 in accordance with the mirror arrangement 46 which divides the image so that part is impressed on camera A and part on camera B. These images are operated on by various video circuits and then projected onto the screen 3 by the projectors 13. It should be noted that two cameras and two projectors are used only to obtain a greater breadth of view. If an adequate lens system is available, a single camera and a single projector could be utilized rather than the dual system shown in FIG. 12.

The synchronizing generator 75, or synchronizer shown in FIG. 12 is located in the main computer rack 8 and constitutes the timing center for the television system. A master oscillator, within the synchronizing generator 75, determines the repetition rate of the synchronizer pulses which are conducted to the camera sweeps 76, the horizon generator 77 and the projector sweeps 78. The camera Video Control Amplifiers 79 amplify the video from the cameras 6 and synchronizing pulse input signals, provides blanking signals and adjusts linearity of the vertical time bases to form a composite video output.

The horizon generator 77 and carrier image insert 80, located in the main rack 8, combine the two video signals representing the electrical equivalent of the view of the carrier and the horizon. A keyed gating circuit blocks out a portion of the horizon signal in the exact shape of the carrier.

The video power amplifiers 81, located on the projector rack consists of three stages of conventional design. Two amplifiers are utilized, one for each projector. The projector sweeps 78 located on the projector rack, form linear horizontal and vertical sweep currents in the projection tube deflection coils. The sloped blank generator 82 provides a means for blending the images from projector so that no line of juncture between them is noticeable. It is thus seen that a standard closed circuit television system, using insertion technique, may be used to provide projection on the screen 3 of the desired image 71.

FIG. 13 shows in block diagram form the operation of the flight computer units. Information in the form of analog voltages is sent to the computer 8 from the rudder pedals, control stick 40, throttle 41 and the programmed flight unit 84.

If a programmed flight is desired, the programmed flight voltages are fed to the computer, by means of an instructor controlled switch, to automatically guide the trainer around a roger approach curve.

If a manual or normal flight is desired, the flight information from the rudder pedals, control stick and throttle are sent to the computer. This information is utilized to compute the roll angle, pitch angle, heading angle, altitude, elevation angle, and the relative position and bearing of the aircraft to the carrier in reference to aircraft and ground axes. The flight velocity, as resolved into North-South and East-West rectangular coordinates by an azimuth resolver, is utilized to position the pen 59 on the plotting board 57. Variations in altitude, as controlled primarily by the control stick 40, are used to alter the position of pen 61 on the altitude plotting board 58.

Voltages analogous to the aircraft position are derived from the plotting boards 57 and 58 and used with analog voltage information from the rudder pedals, control stick and throttle to compute the values of range, bearing, elevation angle, altitude and the inverse angles of azimuth, pitch and roll.

The computed range voltage information is fed to the range servo-mechanism 85 which mechanically alters the position of the television camera carriage 7 relative to the carrier model turntable 5.

The result of the bearing angle computation is conducted to motor 54 to rotate the turntable in accordance with the angle between a line from the aircraft to the centerline of the carrier at its stern.

Altitude information is used by the computer to calculate the elevation angle which in turn is used to derive a voltage to be applied to tilt motor 52 to tilt the turntable 5 with variations in elevation angle. The television projectors 13 are also pitched in response to computed elevation and pitch angles to give the angle of approach to the carrier resulting from movement of the flight control members.

Inverse angles of azimuth, pitch and roll are determined by the computer 8, to drive the gimbals on which the projectors are mounted so as to project the carrier and horizon images in proper relationship to each other. The need for inverse angles may be appreciated by realizing that if the aircraft is manipulated to turn to the right, that since the cockpit is stationary, the image of the carrier must move to the left.

The gimbal system referred to is illustrated in FIG. 14 and comprises a mounting frame 91 to which is mounted the roll angle motor 92. The motor 92 drives the roll angle frame 43 by means of shaft 93. A pitch angle motor 94 drives the pitch angle frame 96 by means of the shaft 95 which is journaled through the roll angle frame 43. The horizon projection disc 45 of FIG. 2 is rigidly mounted upon the pitch angle frame 96 and therefore moves in pitch according to the position of the frame 96. An azimuth angle motor 97 drives the azimuth frame 99, upon which the projectors 13 are mounted, by way of the drive shaft 98. An elevation angle pitch motor 101 is connected to the projectors 13 by the framework 102 so that upon activation of motor 101, the projectors will vary their position, in the pitch plane, relative to the azimuth frame upon which they are mounted.

The inputs to the four motors 92, 94, 97 and 101 are developed in the computer 8 and are shown in FIG. 13, as being leads to pitch the projector relative to the horizon and those signals used to activate gimbals. It is thus seen that the computed angles of roll, pitch and turn are utilized to move the projectors, and therefore the entire projected scene, relative to the pilot cockpit in roll, pitch and azimuth while elevation angle information activates motor 101 to move the carrier image relative to the horizon image as would occur from elevation angle variations in an actual flight.

It is thus seen that the invention provides a device for visually training aircraft pilots by providing the combination of a rotating and tilting carrier model, a closed circuit television system with a moving camera, a gimbal system for positioning carrier and horizon representations on a screen, and a slide projector system for furnishing the proper LSO signals, with all of these units controlled by either the outputs of an automatic computer whose inputs comprise the pilots control settings or by predetermined signals representing a perfect approach path.

It should be understood that this invention is not limited to specific details of construction and arrangement thereof herein illustrated, and that changes and modifications may occur to one skilled in the art without departing from the spirit of the invention; the scope of the invention being set forth in the following claim.

What is claimed is:

In an apparatus for instruction in flying and landing an aircraft, a simulated aircraft cockpit having flight controls therein, a scale model of a landing surface, means for rotating and tilting the model in response to movement of said flight controls, slide projector means mounted on said model comprising a multiplicity of slides representing landing signals, a projection screen mounted on said model above the landing surface, means for selection of one of said multiplicity of slides for projection on said screen in accordance with the position of the aircraft in the simulated flight relative to the landing surface, a closed circuit television system including a camera, means for moving the camera in respect to the model as a function of range between the simulated aircraft cockpit and landing surface, a television projector electrically interconnected with the television camera, and a projection screen placed so as to receive the projection from the television camera and to be viewed by a student from the cockpit.

References Cited in the file of this patent

UNITED STATES PATENTS

| | | |
|---|---|---|
| 2,385,095 | McCarthy | Sept. 18, 1945 |
| 2,406,751 | Emerson | Sept. 3, 1946 |
| 2,516,069 | Newhouse et al. | July 18, 1950 |
| 2,578,939 | Moran | Dec. 18, 1951 |
| 2,591,752 | Weiklund | Apr. 8, 1952 |
| 2,662,305 | Alric | Dec. 15, 1953 |
| 2,838,848 | Bergstad et al. | June 17, 1958 |
| 2,883,763 | Schaper | Apr. 28, 1959 |

FOREIGN PATENTS

| | | |
|---|---|---|
| 747,274 | France | June 14, 1933 |
| 622,312 | Great Britain | Apr. 29, 1949 |
| 751,628 | Great Britain | July 4, 1956 |